United States Patent Office 2,800,975
Patented July 30, 1957

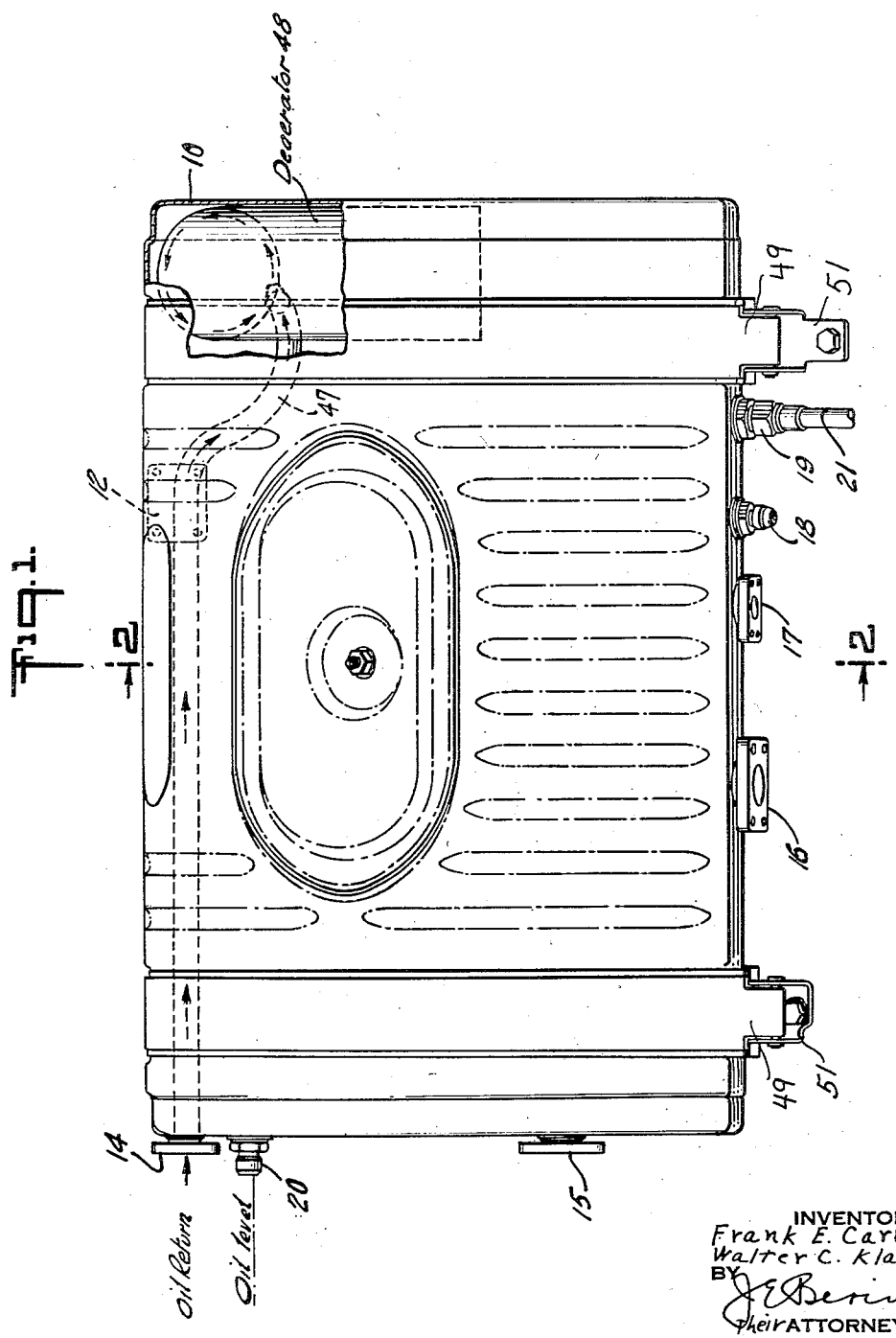

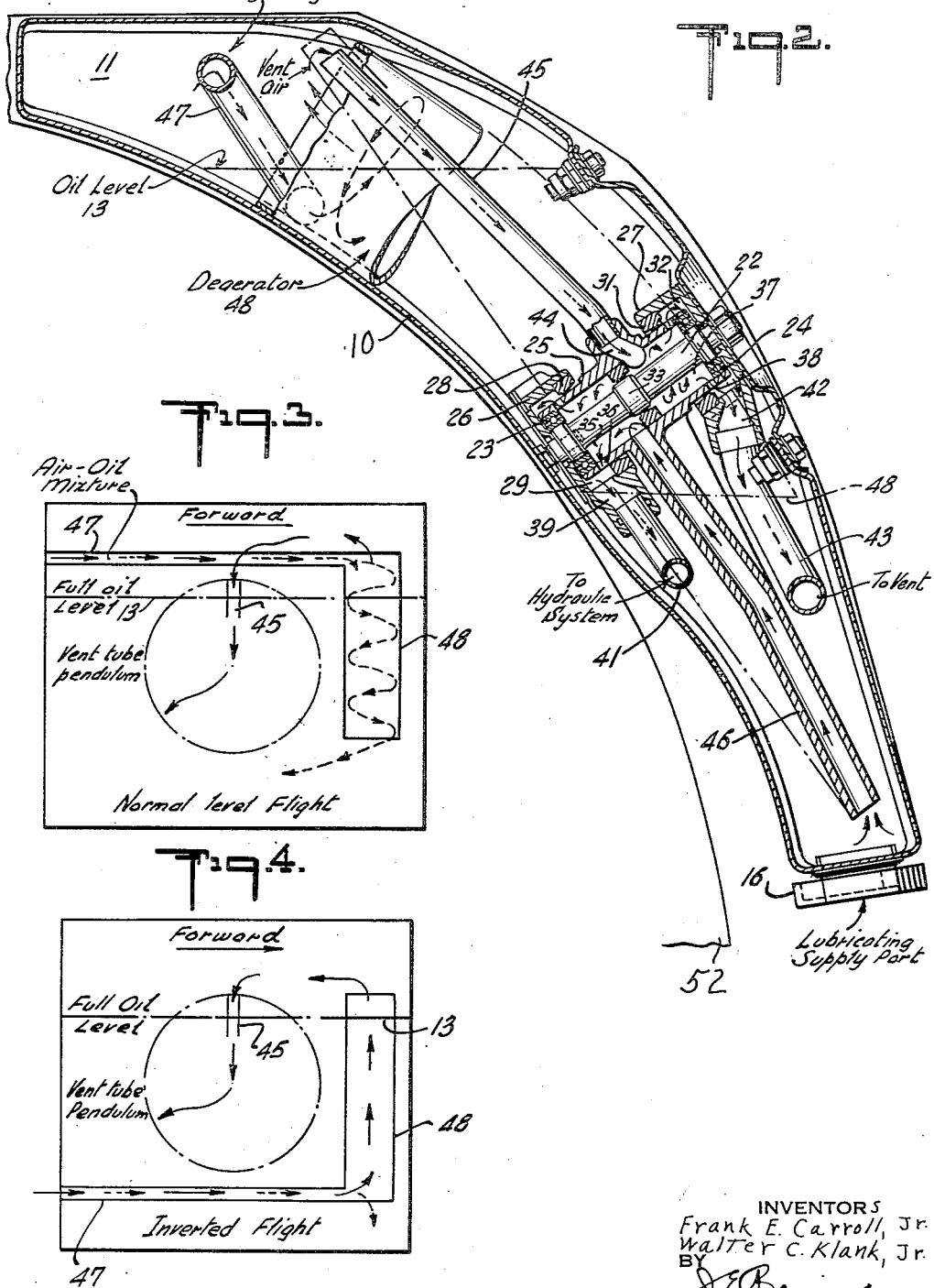

---

2,800,975

LIQUID STORAGE TANK FOR USE IN VEHICLES

Frank E. Carroll, Jr. and Walter C. Klank, Jr., Dayton, Ohio, assignors to United Aircraft Products, Inc., Dayton, Ohio, a corporation of Ohio Application December 8, 1955, Serial No. 551,903

8 Claims. (Cl. 183—2.5)

This invention relates to tanks storing a liquid and useful in aircraft wherein a tank is required continuously to be vented during normal, inverted and intermediate attitudes of flight. While not so limited, the invention has especial application to oil supply systems in aircraft wherein an oil is taken from the tank to a place of use and then returned to the tank for storage and subsequent re-use. In tanks and systems as described, the oil is circulated by pumps and there is entrained in the oil varying amounts of air. It is a design objective to construct the tank with the greatest possible ability to separate such entrained air from the oil and to vent it to the atmosphere.

An object of this invention is to incorporate in a tank as described means for supplying oil from a single tank to both the engine lubrication system and hydraulic actuating control system, there being a single compartment and a single oil in the tank representing the source of supply for both systems.

Another object of the invention is to provide separated outlets from the tank for flow to the lubricating and hydraulic systems, at least one of which outlets is constructed and arranged to be adequately supplied with oil in the tank in any of the described attitudes of flight of the aircraft.

A further object of the invention is to provide a common inlet for the oil returning to the tank from the lubricating and hydraulic systems.

Still another object of the invention is to enable the air in the returning oil to be more readily removed from the returning oil.

A still further object of the invention is to provide deaerating means in the tank useful in releasing entrained air during normal flight of the aircraft and additionally useful in guiding entrained air to the tank vent in an inverted position of flight.

Other objects and structural details of the invention will more clearly appear from the following description, when read in connection with the accompanying drawings, wherein:

Fig. 1 is a view in front elevation of a tank in accordance with the illustrated embodiment of the invention;

Fig. 2 is a view in cross section, taken substantially along the line 2—2 of Fig. 1;

Fig. 3 is a diagram showing relative positions of some of the parts in a normal attitude of flight; and Fig. 4 is a view similar to Fig. 3, showing the same parts as they appear in an inverted attitude of flight.

Referring to the drawings, the tank of the illustrated embodiment of the invention is one adapted for use in aircraft and for connection in the engine lubricating oil circulating system and the hydraulic actuating control system to supply both such systems from a single body of oil contained in the tank. The illustrated tank is made up of a shell 10 of fabricated sheet metal construction and providing a single fully enclosed compartment 11 in its interior.

The tank is filled and refilled with oil by means including a connection 12. The normal oil level in the tank is indicated by a line 13 and it will be noted that the height of the normal oil level is such as to leave a space of somewhat substantial volume in the upper part of the tank, above the oil level, unfilled.

In cross sectional appearance, the tank shell 10 has a generally rectangular appearance, although shaped arcuately in conformance with the dimensions of the space which it occupies in a particular aircraft installation. The width of the shell is, moreover, variable. Thus, in what may be considered to be the normal upper portion of the shell 10, which is that portion uppermost in a normal flight attitude, the shell is relatively wide and of large volume. Toward the normal lower portion of the tank, the width of the shell 10 is reduced so that this portion is of relatively smaller volume.

Mounted in the shell 10 are other fittings, including a fitting 14 in the upper left hand end of the shell (Fig. 1) adapted to be connected to the oil return line within which, at a point in advance of the fitting 14, the flow lines from the lubricating system and from the hydraulic system are joined together. A fitting 15 represents the vent connection and fittings 16 and 17 the outlet connections from the tank to the lubricant system and the hydraulic system respectively. Fitting 18 is for purposes of drain and fitting 19 is for attachment of a hose 21 thereto leading to a pressure actuated quantity indicating gauge (not shown). Beneath the oil return fitting 14 in the upper portion of the tank is a still further fitting 20 representing an overflow drain or gauge. Thus, arrival of the oil level during filling at the horizontal line of the fitting 20 will serve to indicate that the tank is full.

In an intermediate horizontal plane of the shell 10 is a shaft 22 installed in a stationary manner between opposing or front and rear walls of the shell. Rotatably mounted on the shaft 22, through end bearings 23 and 24 is a cylindrical member 25. The ends of the member 25 are in turn received in relatively stationary boss formations 26 and 27. A seal 28, disposed between the boss formation 26 and the cylindrical member 25, defines with such member and boss formation an annular chamber 29. Similarly, a seal 31 defines with the cylindrical member 25 and the boss formation 27 an annular chamber 32. At the center of the shaft 22 is a relatively enlarged portion 33 engaged by a seal 34 in the cylindrical member 25. The result is to divide the interior of the member 25 into a chamber 35 communicating through a set of radial ports 36 with the annular chamber 29, and a chamber 37 communicating through a set of radial ports 38 with the annular chamber 32. The boss formation 26 is formed with a passage 39 which at its one end communicates with the annular chamber 29 and at its other end receives one end of a conduit 41 extending to and communicating at its other end with the hydraulic outlet fitting 17. The boss formation 27 is formed with a passage 42 which at its one end communicates with the annular chamber 32 and at its other end receives one end of a conduit 43 extending to and communicating at its other end with the vent fitting 15. Further, the cylindrical member 25 is formed with a passage 44 communicating at its one end with the chamber 37 and receiving at its other end one end of an elongated tube 45 the other end of which extends outwardly in the tank in a manner to project through and beyond the oil level therein or into the aforementioned space above the oil level. Similarly, the chamber 35 communicates with the interior of a tube 46 which is attached to or formed integrally with the cylindrical member 25 and extends outwardly in the tank in a direction substantially diametrically opposed to the tube 45.

The tube 46 is relatively heavy and acts as a pendulum, holding the assembly further comprising the cylindrical member 25 and the tube 45 in the position shown wherein the tube 46 extends downwardly toward the normal bottom of the tank and the tube 46 extends upwardly into the normal top of the tank. Tilting motions of the tank, corresponding to diving and climbing attitudes of flight of the aircraft, result in relative rotary movement between the shell 10 and the described pendulum assembly so that the tube 46 always will extend into the lowermost reaches of the tank and the tube 45 will extend into the uppermost portions thereof, above the oil level. According to the construction and arrangement of parts, therefore, the open outer end of the tube 46 always is submerged in the body of oil in the tank and actuation of the hydraulic controls always will find hydraulic fluid available, even in inverted flight. Likewise, whatever the flight attitude, the air space above the oil level always is vented to the exterior of the tank. The fitting 16, representing the outlet connection to the lubrication system, communicates as shown with the normal bottom portion of the tank. It is a relatively fixed outlet filled with oil in most normally encountered flight attitudes.

The return fitting 14 communicates with one end of a conduit 47 which extends longitudinally through the normal upper portion of the tank to the opposite end thereof, the other end of such conduit being directed into the open upper end of a can type deaerator 48 stationarily installed in the tank as by welding to the shell 10 or the like. The deaerator can 48 is vertically arranged in the tank, its open lower end terminating at a point beneath the plane of the mounting shaft 22 of the pendulum assembly. Oil discharged into the deaerator can descend therein toward the bottom of the tank. Further, the discharge end of the conduit 47 is so disposed with respect to the can 48 as to discharge the oil tangentially against the internal side wall of the can to impart to the discharged oil a spiral swirling motion, promoting, it will be understood, a release of entrained air. The released air rises through the open upper end of the can into the communicating space above the oil level whence it is vented by the tube 45 projecting into such space.

As indicated in Figs. 3 and 4, the deaerator member 48 may be considered to have two functions, one of which it performs in normal flight attitudes and the other of which it performs in an inverted flight attitude. Thus, in Fig. 3 is depicted the operation above described wherein oil returning from the hydraulic or lubricating systems, or both, is directed through conduit 47 to the deaerator 48 in which it descends to the bottom of the tank. In the inverted position of the parts, as shown in Fig. 4, the oil is similarly returned and directed to the normal upper end of the deaerator can 48 which at this time, however, is submerged in the contained oil in the tank. The oil in the returning air-oil mixture descends through such open upper end into the tank proper. The air, however, tends to rise and is confined and guided by the deaerator can in the most direct path to the vented space above the oil level which is at this time by way of the normal lower end of the can projecting now upward into such space. Since in the inverted position of flight, the outlet connection 16 to the lubrication system is out of communication with the body of oil, large amounts of air are at this time drawn into the system and returned to the tank. The arrangement and construction of the deaerator can thus serves a particularly useful function in channeling such air quickly and directly to the tank vent. In the inverted flight position the normal lower end of the deaerator can 48 is uncovered by the oil. It may be noted, in this connection, that the relatively larger volume of the shell 10, in its normal upper portion, permits such uncovering of the end of the deaerator can even though the ends of the can are not equally disposed between the top and bottom walls of the shell. The deaerator can is in effect located in the upper front end of the tank, the term "front" having reference to the position of the tank in relation to the direction of aircraft travel. The location of the can is designed for and results in the oil discharged therein by way of the conduit 47 completing at least one full circular motion in the deaerator can before reaching the oil level, in the majority of flight attitudes.

There are shown in Fig. 1 mounting straps 49 and brackets 51 serving a purpose in the installation of the tank not affecting the construction and mode of operation in accordance with the invention. Also there is shown in Fig. 2 a fragment 52 of a wall structure defining the compartment or envelope receiving the tank. It will be understood, as before noted, that neither the configuration of the envelope nor of the tank are essential to a carrying out of the invention. The shapes and forms here shown are for illustrative purposes only.

What is claimed is:

1. A storage tank for use in a liquid circulating system of aircraft, including a tank shell partly filled with liquid, there being a space within the shell above the liquid level in different flight attitudes, pendulum actuated means rotatable about an axis extending transversely across an intermediate portion of said shell venting said space to the exterior of said shell, a deaerator can open at its opposite ends and stationarily mounted in said shell with one end extending into the normal upper portion of the shell above said axis and with the other end extending into the normal lower portion of the shell below said axis, and a relatively stationary inlet means in said shell for return flow of liquid to the tank, said means discharging into said one end of the can.

2. A storage tank for use in a liquid circulating system of aircraft, including a tank shell partly filled with a liquid and having normal upper and lower portions, vent means including a tube mounted for rotary motion about an axis extending transversely across an intermediate portion of said shell and extending upward into the space above the liquid level, an open ended deaerator can stationarily mounted in said shell with one end thereof extending into the normal upper portion of the shell and terminating above said axis and with the other end thereof extending into the normal lower portion of the shell and terminating below said axis, and a relatively fixed liquid return line arranged to discharge into said one end of the deaerator can, said can being of such length that in normal and inverted flight attitudes opposite ends thereof tend to project above the liquid level.

3. A storage tank according to claim 2 characterized in that said deaerator can is located in the forward part of said shell in relation to the direction of aircraft flight.

4. A storage tank for use in a liquid circulating system of aircraft, including a tank shell partly filled with a liquid and having normal upper and lower portions and an intermediate portion which is below the normal liquid level in both normal and inverted attitudes of flight, means for venting the interior of the tank above the liquid level in both normal and inverted flight attitudes, an open ended deaerator can stationarily mounted in said shell with one end thereof extending into the normal upper portion of the shell above said intermediate portion and with the other end thereof extending into the normal lower portion of said shell below said intermediate portion and a liquid return line arranged to discharge into said deaerator can.

5. A tank for storing a liquid used in two different liquid circulating systems in aircraft, including a shell having normal upper and lower portions and partly filled with the liquid, there being an intermediate portion in said tank shell which is beneath the normal liquid level in both normal and inverted flight positions of said shell, a common inlet to said shell from said systems, a can type open ended deaerator vertically arranged in said shell to receive liquid from said common inlet at its upper end and to discharge such liquid from its lower end, said can being stationarily installed in said tank shell with the opposite ends thereof extending into the upper and lower portions of said shell respectively, a relatively fixed liquid return line extending from said common inlet to the said upper end of said deaerator for discharge therein air released from said liquid during its flow through said deaerator in normal flight rising through the upper end thereof into the space above the liquid level, air entrained in the liquid from said common inlet during inverted flight being guided by said deaerator for discharge through the other end thereof into the space above the liquid level, means for venting the space above the liquid level in both normal and inverted flight attitudes, and outlet means to said systems for said shell.

6. A tank according to claim 5, characterized in that said outlet means comprises separate outlets to said systems, one of which is continuously supplied with liquid in both normal and inverted flight positions and the other of which is open to said space in inverted flight position.

7. A tank for storing oil constituting a common source of supply for the hydraulic and lubricating systems of aircraft, including a shell partly filled with the oil and having normal upper and lower portions, a hub member relatively rotatably disposed in a transverse axis in an intermediate portion of the shell, respective chambers in said hub communicating with the atmosphere for venting and with one of said systems for supply thereto, substantially diametrically opposed tubes communicating at their one ends with respective chambers in said hub member and extending approximately radially therefrom outward in the tank, an outlet in the normal lower portion of the shell for supply of oil to the other system, inlet means for returning the oil from said systems to the normal upper portion of said shell, and an open ended deaerator can vertically arranged within said shell to receive returning oil from said inlet means at its upper end, the opposite ends of said can being on opposite sides of said transverse axis.

8. A storage tank for use in a liquid circulating system of aircraft, including a tank shell partly filled with a liquid and having normal upper and lower portions and an intermediate portion, means for venting the interior of the tank above the liquid level in both normal and inverted flight attitudes, an open ended deaerator can stationarily mounted in said shell with one end thereof extending into the normal upper portion of the shell above said intermediate portion and with the other end thereof extending into the normal lower portion of said shell below said intermediate portion, said can being of such length that in normal flight one end thereof tends to project above the liquid level and in inverted flight the other end tends to project above the liquid level, and a relatively fixed liquid return line arranged to discharge into said one end of the deaerator can.

References Cited in the file of this patent
UNITED STATES PATENTS

| | | |
|---|---|---|
| 2,586,671 | Landis | Feb. 19, 1952 |
| 2,662,538 | Cervino et al. | Dec. 15, 1953 |
| 2,753,011 | Downs | July 3, 1956 |
| 2,765,866 | Carroll et al. | Oct. 9, 1956 |